(12) United States Patent
    Oda

(10) Patent No.: US 10,871,184 B2
(45) Date of Patent: Dec. 22, 2020

(54) JOURNAL BEARING AND ROTARY MACHINE

(71) Applicant: MITSUBISHI HEAVY INDUSTRIES COMPRESSOR CORPORATION, Tokyo (JP)

(72) Inventor: Takashi Oda, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/167,827

(22) Filed: Oct. 23, 2018

(65) Prior Publication Data

US 2019/0128272 A1    May 2, 2019

(30) Foreign Application Priority Data

Nov. 1, 2017    (JP) ................. 2017-212016

(51) Int. Cl.
    *F16C 17/03*      (2006.01)
    *F04D 29/046*     (2006.01)
    (Continued)

(52) U.S. Cl.
    CPC ............. *F16C 17/03* (2013.01); *F04D 17/12* (2013.01); *F04D 29/046* (2013.01); *F04D 29/047* (2013.01); *F04D 29/057* (2013.01); *F16C 17/02* (2013.01); *F16C 17/26* (2013.01); *F16C 33/08* (2013.01); *F16C 33/122* (2013.01); *F05B 2240/50* (2013.01); *F05D 2300/506* (2013.01); *F16C 2360/44* (2013.01)

(58) Field of Classification Search
    CPC .......... F16C 17/03; F16C 17/26; F16C 33/08; F16C 33/122; F16C 2360/44
    See application file for complete search history.

(56) References Cited

U.S. PATENT DOCUMENTS 3,022,123 A  *  2/1962  Gruber ................... F16C 17/03
                                                    384/311
3,339,990 A  *  9/1967  Wendt .................... F16C 17/03
                                                    384/311

(Continued)

FOREIGN PATENT DOCUMENTS

JP        S63-303214 A    12/1988
JP        2006-118552 A    5/2006

*Primary Examiner* — James Pilkington
(74) *Attorney, Agent, or Firm* — Osha Bergman Watanabe & Burton LLP

(57) ABSTRACT

A journal bearing including a plurality of bearing pads having pad surfaces which configured to slidably come into contact with an outer circumferential surface of a rotating shaft and disposed at intervals, a key member provided a part of a pad rear surface which faces radially outward in the bearing pad, having a curved surface which is curved around an axis parallel to the central axis, configured to extend to have the same cross-sectional shape, and formed of a material having a hardness higher than that of a material forming the pad rear surface of the bearing pad, and a housing having a support surface in contact with a part of the curved surface of the key member in the circumferential direction and configured to support the key member and the bearing pad to be swingable from an outer side in a radial direction.

11 Claims, 9 Drawing Sheets

(51) Int. Cl.
*F16C 33/08* (2006.01)
*F16C 17/02* (2006.01)
*F16C 33/12* (2006.01)
*F04D 17/12* (2006.01)
*F16C 17/26* (2006.01)
*F04D 29/057* (2006.01)
*F04D 29/047* (2006.01)

(56) References Cited

U.S. PATENT DOCUMENTS

| | | | | |
|---|---|---|---|---|
| 3,610,711 A | * | 10/1971 | Mierley, Sr. | F16C 17/03 384/311 |
| 4,039,228 A | * | 8/1977 | Repose | F16C 17/03 384/312 |
| 6,767,133 B2 | * | 7/2004 | New | F16C 17/03 384/309 |

* cited by examiner

JOURNAL BEARING AND ROTARY MACHINE

CROSS-REFERENCE TO RELATED APPLICATION

Priority is claimed on Japanese Patent Application No. 2017-212016, filed Nov. 1, 2017, the content of which is incorporated herein by reference.

BACKGROUND

Field

The present disclosure relates to a journal bearing and rotary machine.

Description of Related Art

In rotary machines including rotating shafts of a centrifugal compressor, a steam turbine, a gas turbine, a pump, an engine, and so on, a bearing device is used to rotatably support the rotating shaft. As such a bearing device, there is a journal bearing having a bearing pad with a pad surface which is slidably in contact with a rotating shaft.

For example, Patent Document 1 discloses a constitution in which a rotating shaft is rotatably supported by a plurality of bearing pads provided on an outer side of the rotating shaft in a radial direction. In such a constitution, each of the bearing pads has a pivot substantially at a center thereof. The bearing pad can be swung by bring this pivot into contact with a support metal on an outer side in the radial direction. Here, the pivot has a spherical protrusion at a tip end thereof. The bearing pad is in point contact with the support metal and can be swung in an axial direction and a circumferential direction of the rotating shaft by bringing the spherical protrusion into contact with the support metal.

CITATION LIST

Patent Documents

[Patent Document 1] Japanese Unexamined Patent Application, First Publication No. S63-303214

However, when temperature of a sliding surface of the bearing pad becomes high, it is necessary to reduce the temperature of the bearing pad by using a material having high thermal conductivity as a material of a back metal forming the outer circumferential surface of the bearing pad. When the material having the high heat conductivity is used, hardness of the material is lowered and strength of the back metal is also lowered. When such a material is used to form the bearing pad, damage to the back metal may be caused by a surface pressure generated when the pivot comes into point contact with the support metal.

Further, when an outer circumferential surface of the bearing pad is directly brought into contact with a support member such as the support metal without providing the pivot, damage to the outer circumferential surface of the bearing pad may be caused by friction with the support member.

In either case, when the bearing pad is damaged, a gap between an inner circumferential surface of the bearing pad and an outer circumferential surface of the rotating shaft expands. As a result, vibration may increase when the rotating shaft rotates. Therefore, it is desired to minimize the damage of the bearing pad and to improve the reliability of the journal bearing.

The present disclosure provides a journal bearing and a rotary machine in which reliability of the journal bearing can be improved by minimizing damage to a bearing pad.

SUMMARY

A first aspect of the present disclosure is a journal bearing including a plurality of bearing pads having pad surfaces configured to slidably come into contact with an outer circumferential surface of a rotating shaft and disposed at intervals in a circumferential direction around a central axis, a key member provided at a part of a pad rear surface which faces radially outward in the bearing pad, having a curved surface which is curved around an axis parallel to the central axis, configured to extend to have the same cross-sectional shape in a direction of the central axis in which the central axis extends, and formed of a material having a hardness higher than that of a material forming the pad rear surface of the bearing pad, and a housing having a support surface in contact with a part of the curved surface of the key member in the circumferential direction and configured to support the key member and the bearing pad to be swingable from an outer side in a radial direction of the key member and the bearing pad.

With such a constitution, since the curved surface of the key member extends to have the same cross sectional shape in a direction of the central axis of the rotating shaft, the curved surface is in line contact with the support surface of the housing in a direction parallel to the central axis. Therefore, wear of the curved surface of the key member can be minimized as compared with a case in which it is in point contact with the support surface of the housing. Further, since the hardness of the key member is higher than that of the pad rear surface, the wear of the curved surface can be further minimized.

Further, according to the journal bearing of a second aspect of the present disclosure, in the first aspect, the bearing pad may have a key member mounting surface orthogonal to the radial direction, and the key member may have a fixed surface which faces the key member mounting surface and is orthogonal to the radial direction.

With such a constitution, the fixed surface of the key member is in surface contact with the key member mounting surface of the bearing pad. Therefore, the wear of the bearing pad can be minimized at a contact portion between the key member and the bearing pad.

Further, according to the journal bearing of a third aspect of the present disclosure, in the first or second aspect, only the curved surface may be in contact with the support surface of the housing when the key member and the bearing pad swing.

With such a constitution, only the curved surface of the key member comes into contact with the support surface of the housing. As a result, when the bearing pad swings, the pad rear surface of the bearing pad does not collide with the support surface of the housing. Therefore, it is possible to prevent the pad rear surface of the bearing pad from coming into contact with the support surface of the housing and being worn or to prevent the temperature thereof from increasing.

According to the journal bearing of a fourth aspect of the present disclosure, in any one of the first to third aspects, the journal bearing may further include a concave portion formed in the curved surface of the key member and recessed radially inward at an intermediate position of the curved surface in the circumferential direction, and a positioning member configured to protrude radially inward from the support surface and fixed to the key member in a state in which it is inserted into the concave portion.

With such a constitution, the positioning member is inserted into the concave portion, and the movement of the key member in the circumferential direction can be restricted. Further, even when the positioning member is provided, the key member may bring the curved surface into line contact with the support surface of the housing in a portion other than the concave portion. Accordingly, it is possible to effectively minimize wear of the curved surface of the key member.

Further, according to the journal bearing of a fifth aspect of the present disclosure, in any one of the first to fourth aspects, the curved surface of the key member and the pad rear surface of the bearing pad may have the same curvature radius in the circumferential direction.

With such a constitution, it is possible to easily process the curved surface of the key member and the pad rear surface of the bearing pad.

Further, according to the journal bearing of a sixth aspect of the present disclosure, in any one of the first to fourth aspects, the curved surface of the key member may have a smaller curvature radius in the circumferential direction than the pad rear surface of the bearing pad.

With such a constitution, a region of the curved surface of the key member which is in line contact with the support surface of the housing becomes narrower in the circumferential direction. Therefore, resistance when the bearing pad swings is further reduced, and a following property of the bearing pad can be enhanced. When the region in which the curved surface of the key member is in line contact with the support surface of the housing becomes narrower, the pressure generated between the curved surface of the key member and the support surface of the housing increases. However, since the curved surface of the key member is formed of a material having high hardness, the wear of the curved surface can be minimized even in such a case.

Further, a seventh aspect of the present disclosure is a rotary machine including a rotating shaft, and a journal bearing according to any one of the first to sixth aspects which supports the rotating shaft.

With such a constitution, the wear of the curved surface of the key member can be minimized Therefore, it is possible to prevent a gap between the pad surface of the bearing pad and the outer circumferential surface of the rotating shaft from widening. As a result, it is possible to increase durability of the journal bearing and to the reduce labor and expense of maintaining the rotary machine.

According to the present disclosure, it is possible to improve reliability of the journal bearing by minimizing damage to a bearing pad.

DETAILED DESCRIPTION

Figure 1:
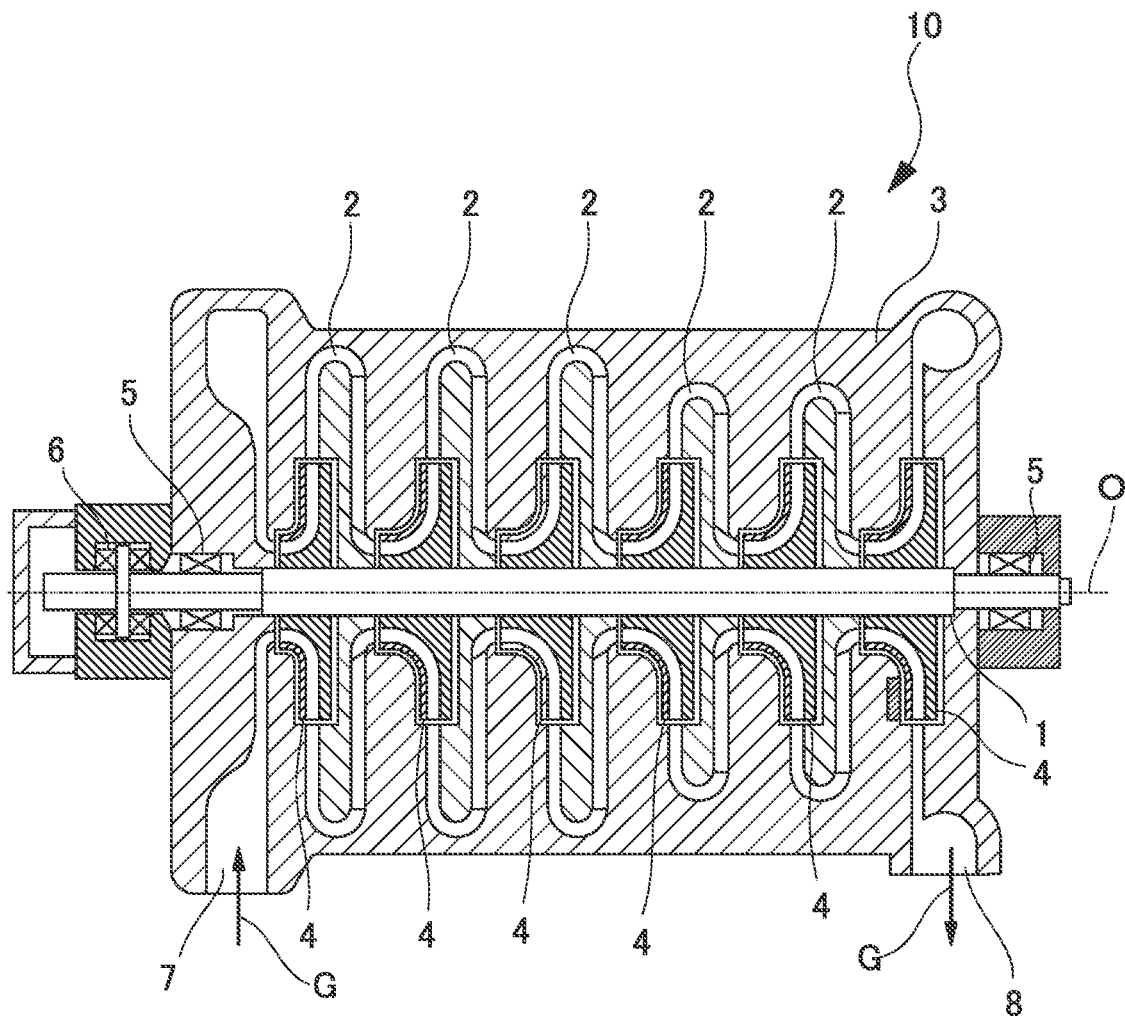
FIG. 1 is a schematic diagram showing a constitution of a centrifugal compressor according to an embodiment of the present disclosure.

Hereinafter, embodiments for implementing a journal bearing and a rotary machine according to the present disclosure will be described with reference to the accompanying drawings. However, the present disclosure is not limited to only these embodiments. FIG. 1 is a schematic diagram showing a constitution of a centrifugal compressor according to an embodiment of the present disclosure.

As shown in FIG. 1, a centrifugal compressor (rotary machine) 10 which is a rotary machine of the embodiment mainly includes a casing 3, a rotating shaft 1 supported to be rotatable around a central axis O in the casing 3, and an impeller 4 which is installed on the rotating shaft 1 and compresses a process gas (working fluid) G using a centrifugal force.

The casing 3 is formed in a cylindrical shape extending along the central axis O. An internal space of which a diameter is repeatedly contracted and expanded is provided in the casing 3. The casing 3 is provided to surround the impeller 4 by accommodating a plurality of impellers 4 in the internal space. In the casing 3, a flow path 2 which allows the process gas G flowing through the impeller 4 to flow from an upstream side to a downstream side is formed at a position between the impellers 4.

A suction port 7 which allows the process gas G to flow into the flow path 2 from an outer side is provided on a first side of the casing 3 in a direction of the central axis O (direction in which the central axis O extends). Further, a discharge port 8 which is continuous with the flow path 2 and allows the process gas G to flow out to the outer side is provided on a second side of the casing 3 in the direction of the central axis O.

The rotating shaft 1 is supported by both ends of the casing 3 in the direction of the central axis O to be rotatable around the central axis O via a journal bearing 5. The rotating shaft 1 is supported on the first side in the direction of the central axis O to be rotatable in the direction of the central axis O via a thrust bearing 6.

The impeller 4 is supported by the rotating shaft 1 to be rotatable around the central axis O. The plurality of impellers 4 are provided at intervals in the direction of the central axis O of the rotating shaft 1. Although FIG. 1 shows an example in which six impellers 4 are provided, it is sufficient if at least one impeller 4 is provided. Each of the impellers 4 compresses the process gas G suctioned from the first side in the direction of the central axis O and discharges it to an outer side of the central axis O in a radial direction.

The flow path 2 guides the process gas G discharged from the upstream impeller 4 located on the first side in the direction of the central axis O to the downstream impeller 4 located on the second side in the direction of the central axis O.

In such a centrifugal compressor 10, the process gas G is introduced from the suction port 7 into the flow path 2. The process gas G is compressed in each of the impellers 4 rotating around the central axis O together with the rotating shaft 1 and is discharged radially outward from an inner side in the radial direction. The process gas G is compressed by passing through the impeller 4 and the flow path 2 provided in a plurality of stages within the casing 3 and then delivered from the discharge port 8.

Figure 2:
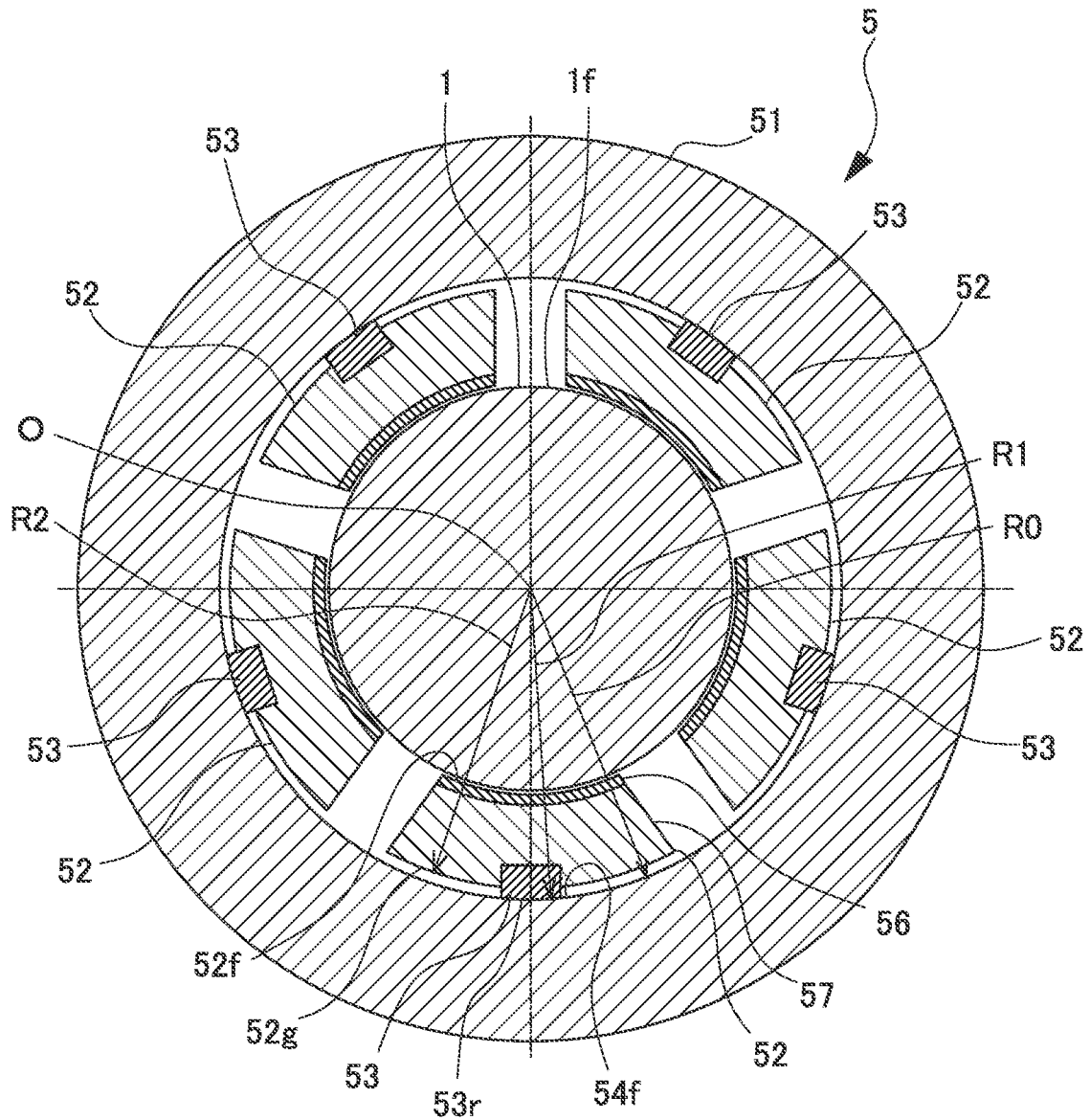
FIG. 2 is a cross-sectional view orthogonal to a central axis of a journal bearing provided in the centrifugal compressor of the embodiment.
Figure 3:
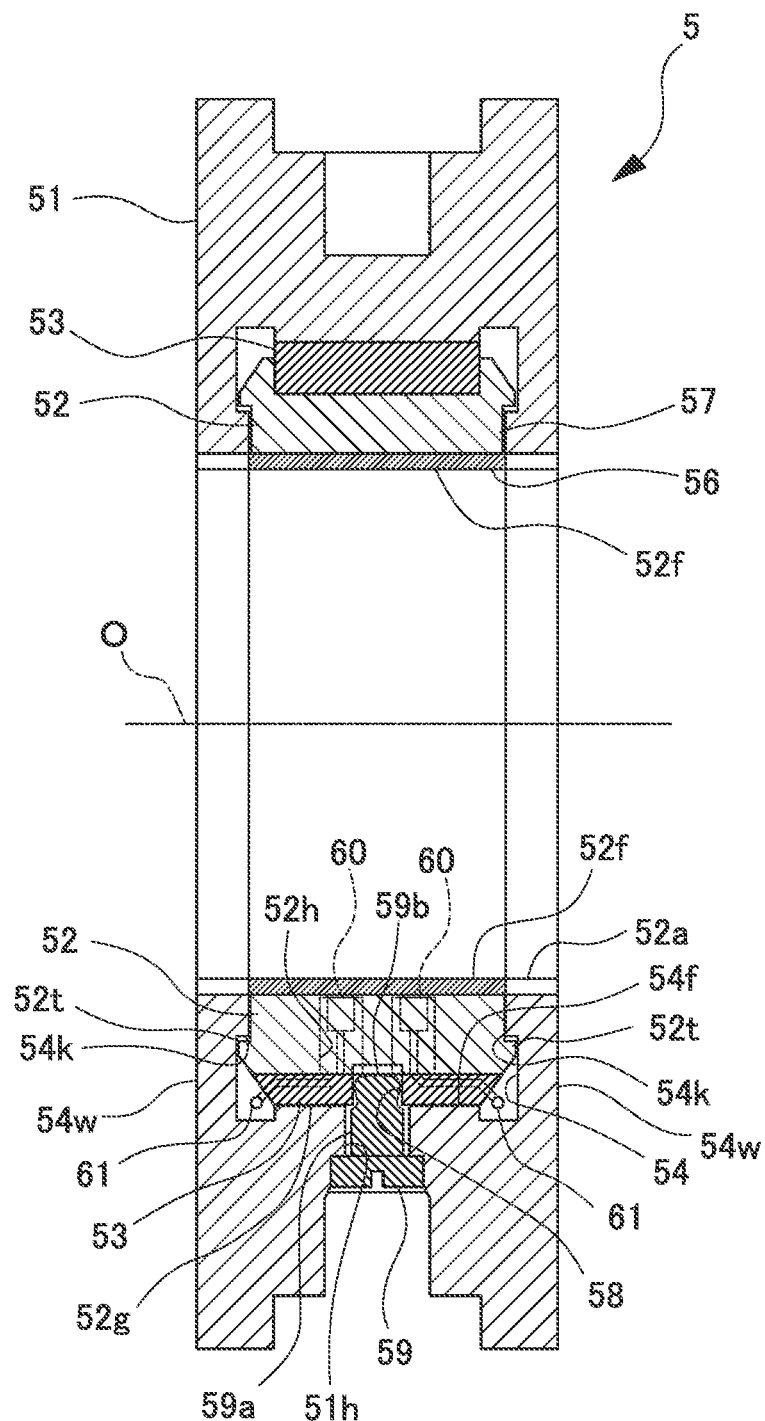
FIG. 3 is a cross-sectional view in a direction along the central axis of the journal bearing.
Figure 4:
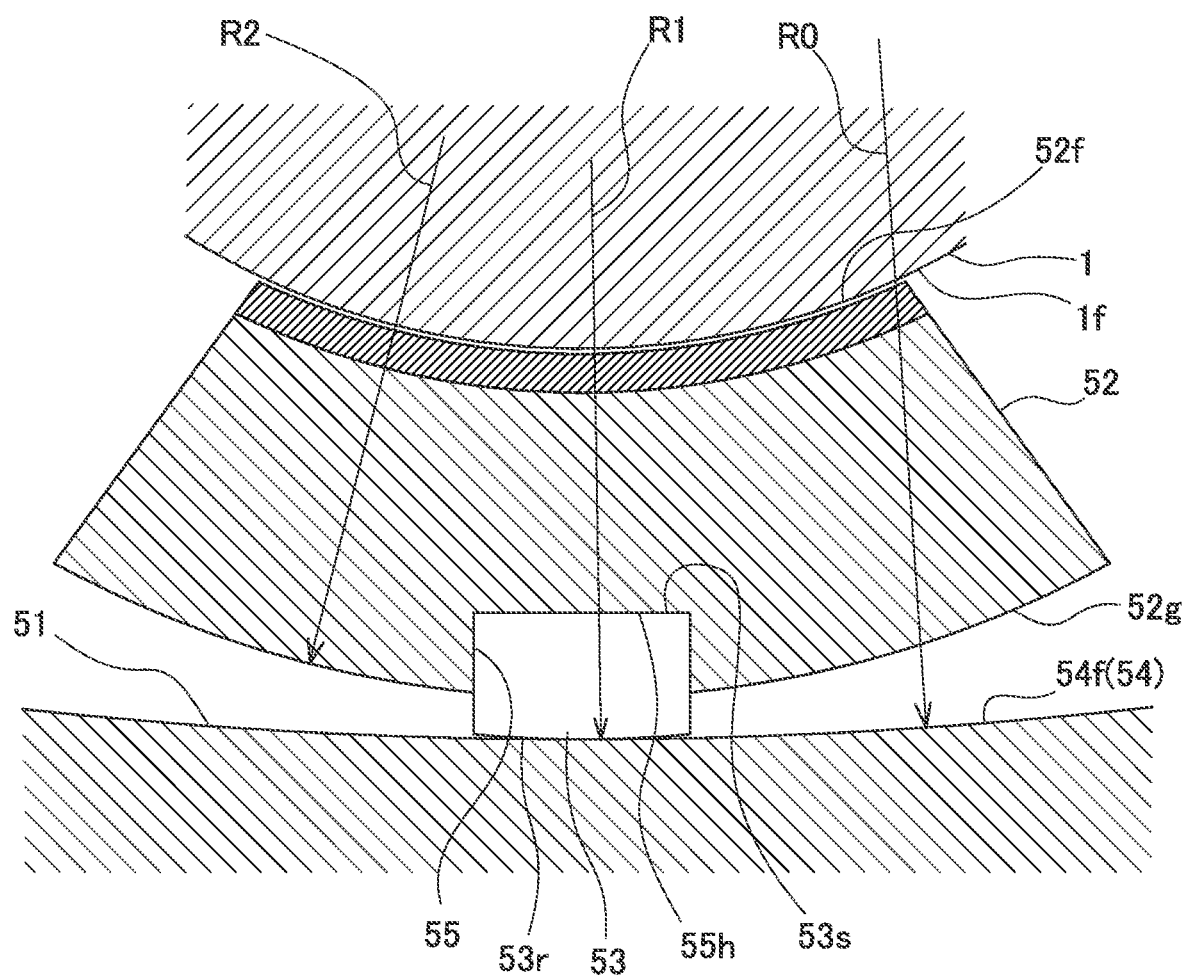
FIG. 4 is a cross-sectional view showing a constitution of a bearing pad of the journal bearing.
Figure 5:
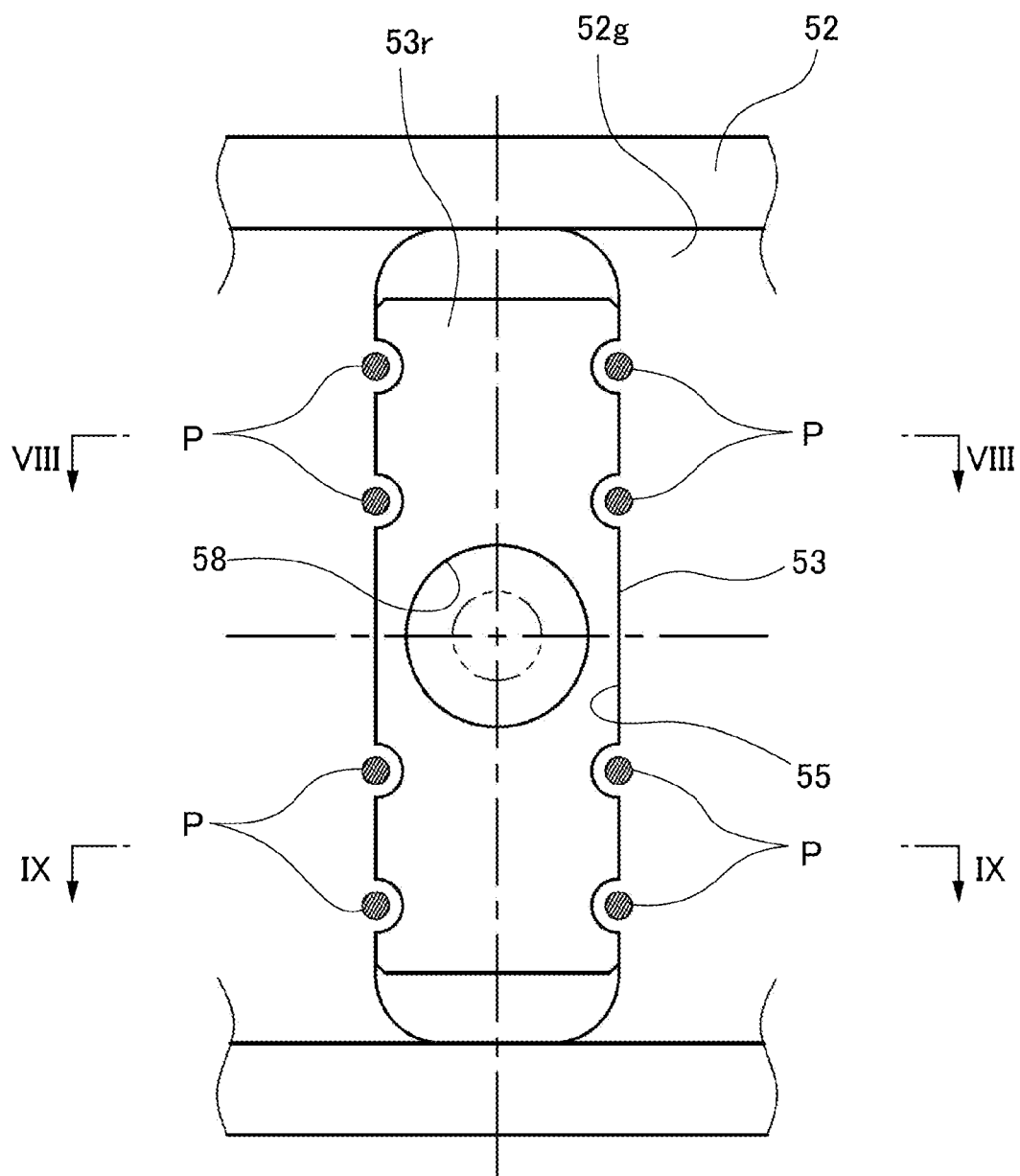
FIG. 5 is a view of a key member provided on the bearing pad when seen from an outer side in a radial direction.
Figure 6:
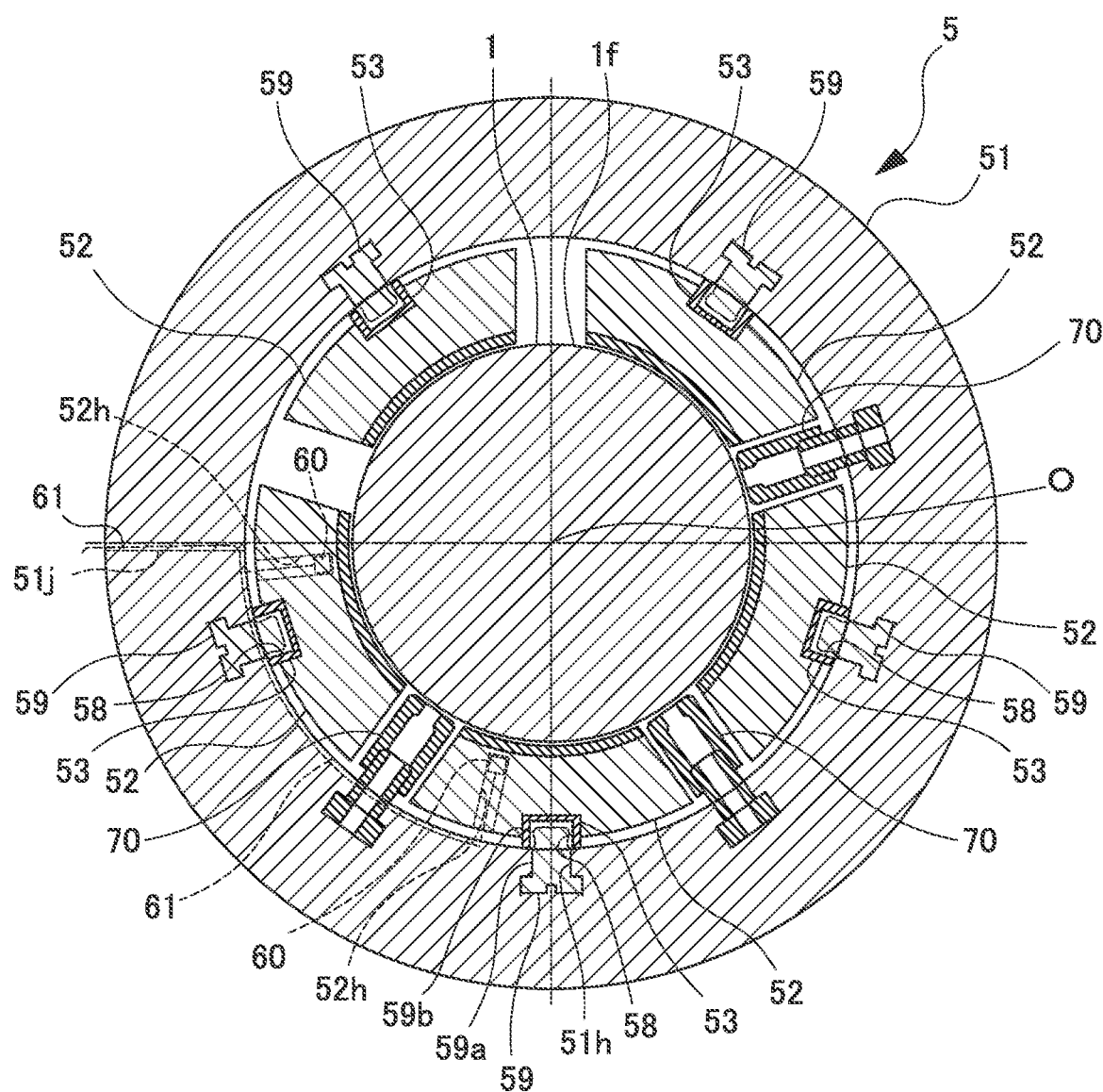
FIG. 6 is a cross-sectional view orthogonal to the central axis of the journal bearing at a position in a direction of the central axial in which a positioning member is provided on the bearing pad.

FIG. 2 is a cross-sectional view orthogonal to the central axis of the journal bearing provided in the centrifugal compressor of the embodiment. FIG. 3 is a cross-sectional view in a direction along the central axis of the journal bearing. FIG. 4 is a cross-sectional view showing a constitution of a bearing pad of the journal bearing. FIG. 5 is a view of a key member provided on the bearing pad when seen from an outer side in a radial direction. FIG. 6 is a cross-sectional view orthogonal to the central axis of the journal bearing at a position in a direction of the central axis in which a positioning member is provided on the bearing pad.

As shown in FIGS. 2 and 3, the journal bearing 5 includes a bearing housing (housing) 51, a bearing pad 52, and a key member 53.

The bearing housing 51 is formed in an annular shape and supports the key member 53 and the bearing pad 52 to be swingable from the outer side in the radial direction. As shown in FIG. 3, the bearing housing 51 has a pad receiving groove 54 which is recessed radially outward from an inner circumferential surface 51a thereof and is continuous in a circumferential direction around the central axis O. The pad receiving groove 54 has a support surface 54f which is circumferentially continuous at a groove bottom portion on the outer side in the radial direction. Therefore, the support surface 54f faces inward in the radial direction. Further, in the pad receiving groove 54, a wall portion 54w which stands inward in the radial direction is formed on both sides of the support surface 54f in the direction of the central axis O. In the wall portion 54w, a protrusion 54k protruding toward the inner side of the pad receiving groove 54 is formed on the inner side in the radial direction.

As shown in FIG. 2, a plurality of bearing pads 52 are provided radially inward with respect to the support surface 54f of the bearing housing 51 at intervals in the circumferential direction. In the embodiment, five bearing pads 52 are provided at regular intervals in the circumferential direction. As shown in FIG. 3, the bearing pads 52 are accommodated in the pad receiving groove 54 of the bearing housing 51.

As shown in FIG. 4, each of the bearing pads 52 has an arc shape in a cross section orthogonal to the central axis O of the rotating shaft 1 and also has a curved plate shape which is wide in the circumferential direction. The bearing pad 52 includes a pad surface 52f which faces inward in the radial direction and a pad rear surface 52g which faces outward in the radial direction. The pad surface 52f is capable of slidably coming into contact with an outer circumferential surface if of the rotating shaft 1.

As shown in FIG. 2, the bearing pad 52 includes a metal portion 56 which forms the pad surface 52f, and a support portion 57 which supports the metal portion 56 from the outer side of the metal portion 56 in the radial direction. The metal portion 56 is formed of, for example, a tin-lead alloy (a so-called white metal). The metal portion 56 is formed to have a predetermined film thickness on an inner circumferential surface of the support portion 57. The support portion 57 is formed of, for example, a copper alloy or the like. An outer circumferential surface of the support portion 57 is the pad rear surface 52g. The metal portion 56 and the support portion 57 are integrally formed.

As shown in FIG. 4, a receiving concave portion 55 recessed inward in the radial direction is formed at an intermediate position of the pad rear surface 52g of the bearing pad 52 in the circumferential direction. The receiving concave portion 55 has a key member mounting surface 55h orthogonal to the radial direction. The key member mounting surface 55h is formed radially inward from the pad rear surface 52g.

The key member 53 is provided on a part of the pad rear surface 52g which faces radially outward in the bearing pad 52. The key member 53 has a curved surface 53r which faces outward in the radial direction and a fixed surface 53s which faces inward in the radial direction.

Figure 8:
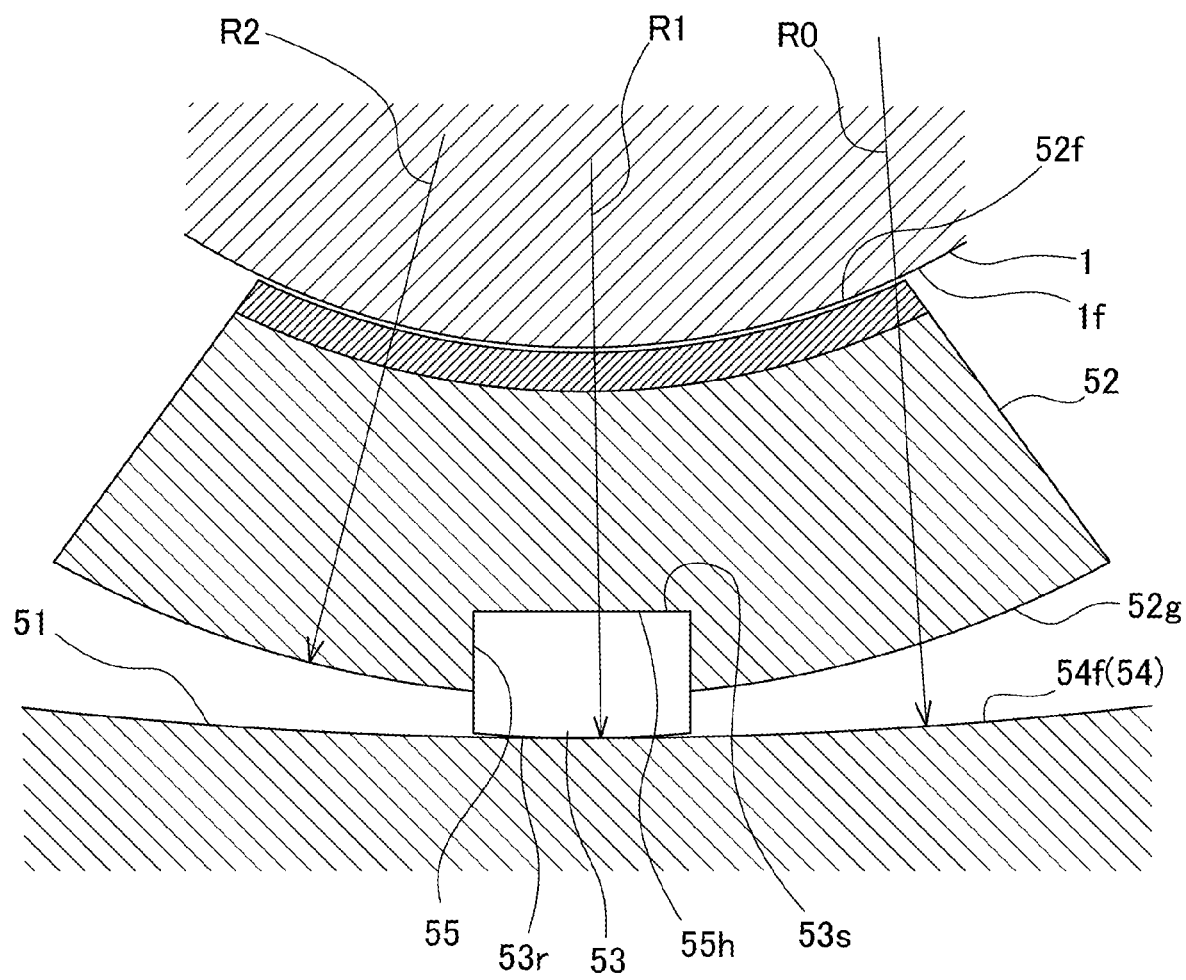
FIG. 8 is a schematic cross-sectional view of the bearing pad of the journal bearing taken along line VIII-VIII in FIG. 5.
Figure 9:
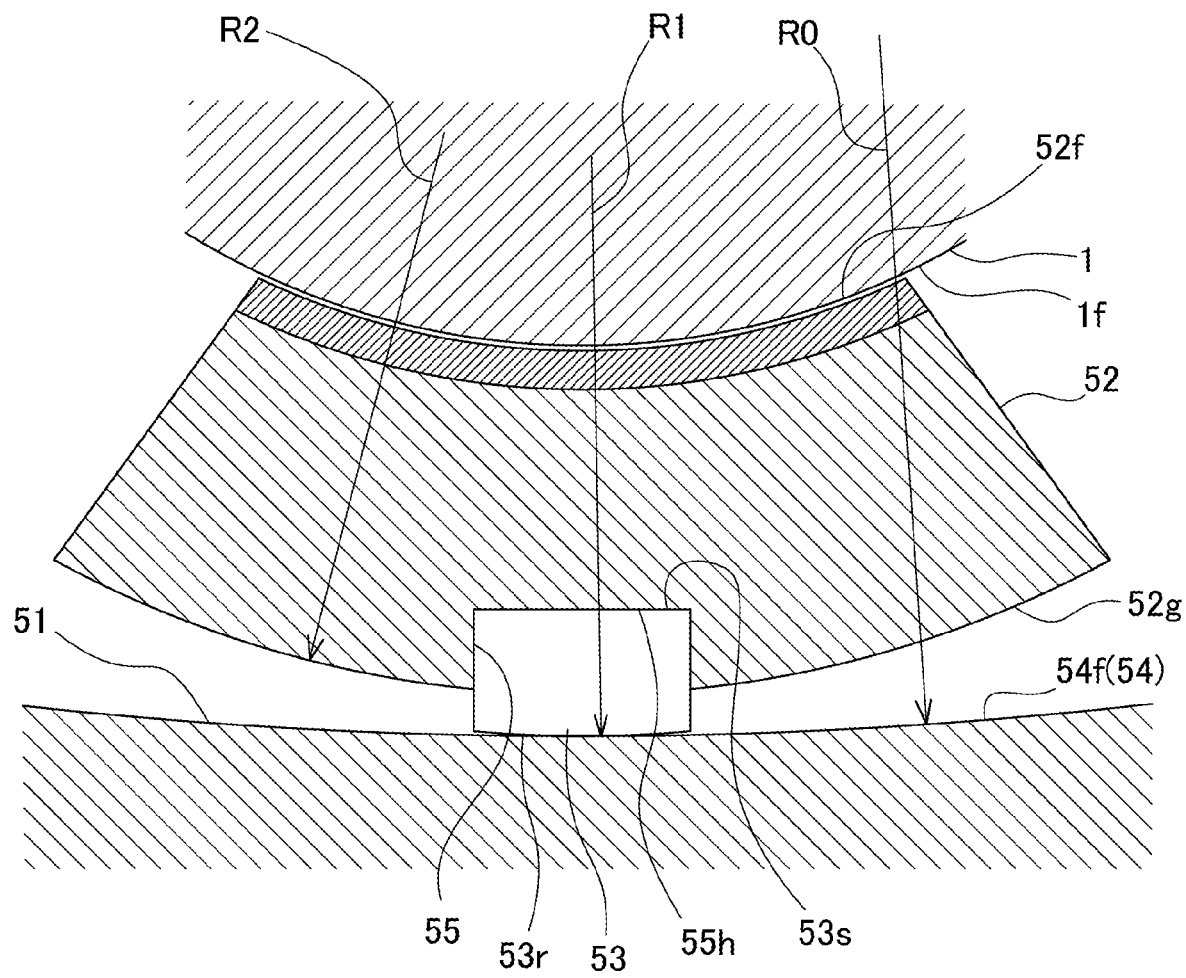
FIG. 9 is a schematic cross-sectional view of the bearing pad of the journal bearing taken along line IX-IX in FIG. 5.

The curved surface 53r is curved in a convex shape around an axis parallel to the central axis O of the rotating shaft 1 to protrude outward in the radial direction. The curved surface 53r is continuously formed with the same curvature radius in the direction of the central axis O of the rotating shaft 1, as shown in FIGS. 8 and 9. Therefore, the key member 53 extends to have the same cross-sectional shape in the direction of the central axis O of the rotating shaft 1.

A curvature radius R1 of the curved surface 53r is smaller than a curvature radius R0 of the support surface 54f of the bearing housing 51. Therefore, in the key member 53, only a part of the curved surface 53r in the circumferential direction is in contact with the support surface 54f. Since the curved surface 53r of the key member 53 is continuous in the same shape in the direction of the central axis O, it is in line contact with the support surface 54f in a direction parallel to the central axis O. Further, in the embodiment, the curvature radius R1 of the curved surface 53r is the same as a curvature radius R2 of the pad rear surface 52g of the bearing pad 52.

The fixed surface 53s is a plane orthogonal to the radial direction of the rotating shaft 1. A part of a thickness of the key member 53 in the radial direction is accommodated (fitted) into the receiving concave portion 55. The key member 53 brings the fixed surface 53s into surface contact with the key member mounting surface 55h in the receiving concave portion 55. As shown in FIG. 5, the key member 53 is fixed to the pad rear surface 52g of the bearing pad 52 by performing punching at a plurality of portions P on a boundary with the pad rear surface 52g on a side surface.

Such a key member 53 is formed of a material forming the pad rear surface 52g of the bearing pad 52, that is, a material having higher hardness than that of a material forming the support portion 57, for example, carbon steel such as S25C or the like.

As shown in FIG. 2, as a part of the curved surface 53r of the key member 53 in the circumferential direction comes into contact with the support surface 54f of the bearing housing 51, each of the bearing pads 52 is swingable together with the key member 53 around an axis parallel to the central axis O of the rotating shaft 1.

When such a bearing pad 52 swings, only the curved surface 53r of the key member 53 swings in line contact with the support surface 54f of the bearing housing 51. That is, the pad rear surface 52g of the bearing pad 52 does not come into contact with the support surface 54f of the bearing housing 51.

Further, as shown in FIG. 5, a concave portion 58 recessed radially inward from the curved surface 53r is formed in a center portion of the key member 53 in the circumferential direction and the direction of the central axis O. As shown in FIGS. 3 and 6, a positioning member 59 which restricts movement of the key member 53 and the bearing pad 52 in the circumferential direction is provided at a position of the bearing housing 51 which is opposite to the concave portion 58 in the radial direction. The positioning member 59 of the embodiment includes a bolt main body 59a having a male screw portion on an outer circumferential surface thereof, and a spherical portion 59b formed at a tip end of the bolt main body 59a. The positioning member 59 is fixed to the bearing housing 51 by screwing the bolt main body 59a into a bolt insertion hole 51h passing through the bearing housing 51 in the radial direction. In the positioning member 59, the spherical portion 59b of the tip end protrudes radially inward from the support surface 54f. The spherical portion 59b is inserted into the concave portion 58 of the key member 53. A predetermined clearance which does not hinder the swing of the key member 53 and the bearing pad 52 is provided between the spherical portion 59b and the concave portion 58. When the key member 53 is displaced in the circumferential direction, further movement in the circumferential direction is restricted by the spherical portion 59b colliding with an inner circumferential surface of the concave portion 58.

As shown in FIG. 3, the movement of the bearing pad 52 in the direction of the central axis O is restricted by the wall portions 54w located on both sides in the direction of the central axis O. Further, the bearing pad 52 has a convex portion 52t which protrudes on both sides in the direction of the central axis O. In a state in which the bearing pad 52 is accommodated in the pad receiving groove 54, the convex portion 52t is located at an outer side of the protrusion 54k of the wall portion 54w in the radial direction. In the bearing pad 52, the movement of the bearing pad 52 beyond a certain dimension inward in the radial direction is restricted by the convex portion 52t colliding with the protrusion 54k of the wall portion 54w.

As shown in FIG. 6, a lubricating oil supply nozzle 70 which supplies lubricating oil between the rotating shaft 1 and the bearing pad 52 is provided between the bearing pads 52 adjacent to each other in the circumferential direction.

As shown in FIGS. 3 and 6, a temperature sensor 60 which detects temperature of an oil film of the lubricating oil formed between the rotating shaft 1 and the bearing pad 52 by detecting temperature of the metal portion 56 is provided on the journal bearing 5.

A sensor insertion hole 52h recessed inward in the radial direction is formed in the pad rear surface 52g of the bearing pad 52. The temperature sensor 60 is inserted into the sensor insertion hole 52h. A sensor wiring 61 of the temperature sensor 60 is disposed to extend in the circumferential direction through a gap formed between an inner circumferential surface of the pad receiving groove 54 of the bearing housing 51 and the bearing pad 52. The sensor wiring 61 is led out to the outer side in the radial direction through a wiring hole 51j formed at a predetermined position of the bearing housing 51. The sensor wiring 61 is connected to a controller (not shown) and outputs an electric signal corresponding to the detected temperature to a controller.

According to the journal bearing 5 and the centrifugal compressor 10 as described above, the key member 53 is provided on a part of the pad rear surface 52g of the bearing pad 52. Since the curved surface 53r of the key member 53 extends to have the same cross-sectional shape in the direction of the central axis O of the rotating shaft 1, the curved surface 53r comes into line contact with the support surface 54f of the bearing housing 51 in the direction parallel to the central axis O. Therefore, a contact area is increased and wear of the curved surface 53r of the key member 53 can be minimized as compared with a case in which it is in point contact with the support surface 54f of the bearing housing 51 by a pivot or the like. Further, since hardness of the key member 53 is higher than that of the pad rear surface 52g of the bearing pad 52, the wear of the curved surface 53r in contact with the support surface 54f of the bearing housing 51 can be further minimized Therefore, it is possible to minimize damage to the pad rear surface 52g of the bearing pad 52 and to improve reliability of the journal bearing 5.

As a result, it is possible to prevent a gap between the pad surface 52f of the bearing pad 52 and the outer circumferential surface 1f of the rotating shaft 1, which may be caused by the damage to the bearing pad 52, from widening. Accordingly, it is possible to minimize an increase in vibration of the rotating shaft 1 due to the wear of the pad surface 52f of the bearing pad 52.

Further, since the key member 53 is provided on only a part of the pad rear surface 52g of the bearing pad 52, it is possible to minimize an increase in cost. In addition, it is possible to enhance durability of the journal bearing 5 and to reduce the labor and expense of maintaining the centrifugal compressor 10.

Further, the key member 53 has the fixed surface 53s opposite to the key member mounting surface 55h and orthogonal to the radial direction of the rotating shaft 1. Due to such a constitution, the fixed surface 53s of the key member 53 comes into surface contact with the key member mounting surface 55h of the bearing pad 52. Therefore, it is possible to increase the contact area at a contact portion between the key member 53 and the bearing pad 52 and to minimize the wear of the bearing pad 52.

Further, since only the curved surface 53r of the key member 53 is in contact with the support surface 54f of the bearing housing 51, the pad rear surface 52g of the bearing pad 52 does not collide with the support surface 54f of the bearing housing 51 when the bearing pad 52 swings. Therefore, it is possible to prevent the pad rear surface 52g of the bearing pad 52 from coming into contact with the support surface 54f of the bearing housing 51 and being worn, or to prevent the temperature thereof from being increased Further, it is possible to restrict the movement of the key member 53 in the circumferential direction by inserting the positioning member 59 into the concave portion 58 formed in the curved surface 53r of the key member 53. In such a constitution having the positioning member 59, the key member 53 is in line contact with the support surface 54f of the bearing housing 51 at a portion other than the concave portion 58 of the curved surface 53r. Therefore, it is possible to effectively minimize the wear of the curved surface 53r of the key member 53.

In addition, the curved surface 53r of the key member 53 and the pad rear surface 52g of the bearing pad 52 have the same curvature radius in the circumferential direction around the rotating shaft 1. Due to such a constitution, it is possible to easily process the curved surface 53r of the key member 53 and the pad rear surface 52g of the bearing pad 52.

Although the embodiments of the present disclosure have been described in detail with reference to the drawings, the respective constitutions and combinations thereof in the embodiments are merely examples, and additions, omissions, substitutions, and other modifications of the constitutions are possible without departing from the spirit of the present disclosure. Further, the present disclosure is not limited by the embodiments but is limited by only the scope of the claims.

Figure 7:
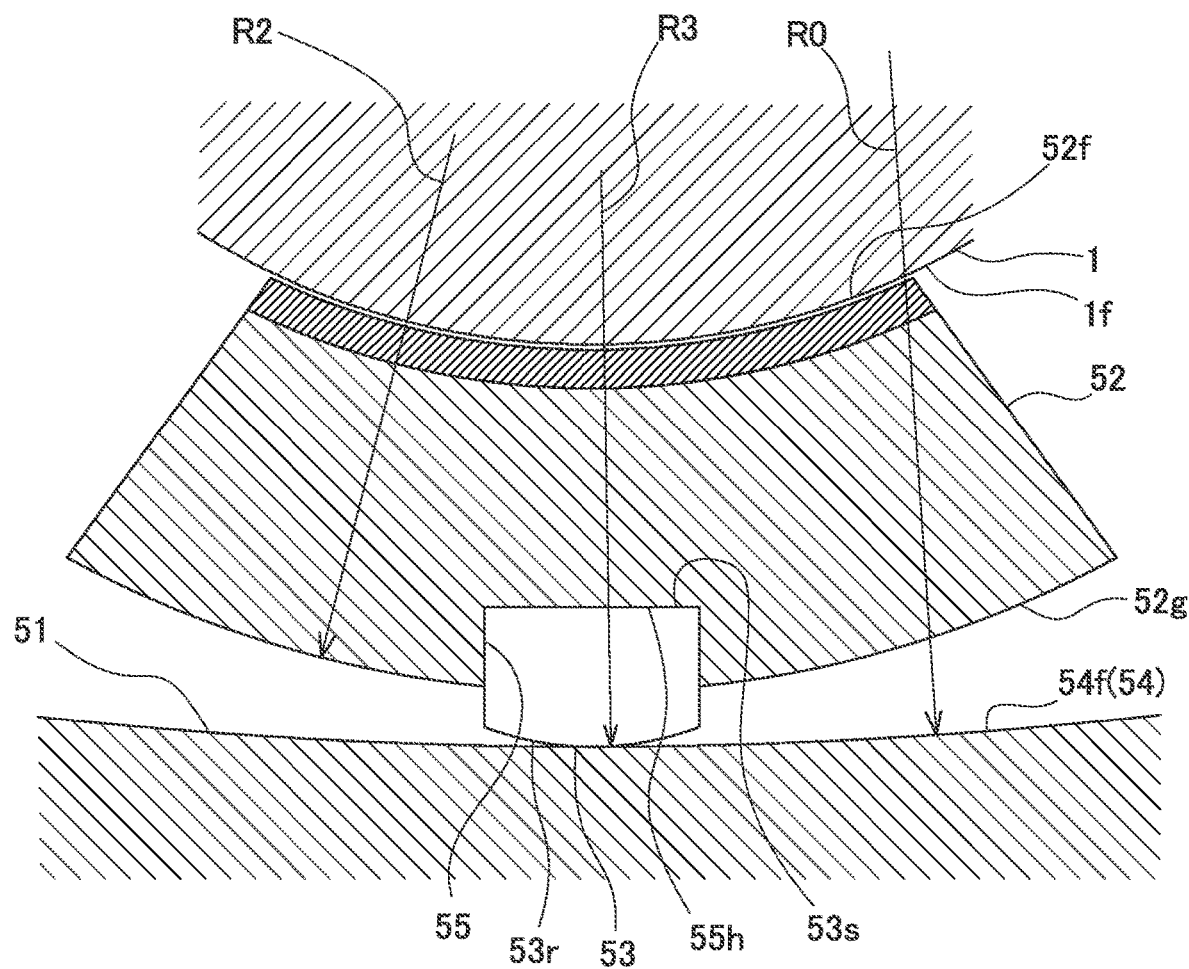
FIG. 7 is a cross-sectional view showing a constitution of a bearing pad in a modified example of the embodiment of the journal bearing.

For example, in the above embodiment, the curvature radius R1 of the curved surface 53r is set equal to the curvature radius R2 of the pad rear surface 52g of the bearing pad 52, but the present disclosure is not limited thereto. For example, as shown in FIG. 7, a curvature radius R3 of the curved surface 53r of the key member 53 can be formed to be smaller than the curvature radius R2 in the circumferential direction around the rotating shaft 1 of the pad rear surface 52g of the bearing pad 52.

Due to such a constitution, a region of the curved surface 53r of the key member 53 which is in line contact with the support surface 54f of the bearing housing 51 becomes narrower in the circumferential direction. Therefore, resistance when the bearing pad 52 swings is further reduced, and following property of the bearing pad 52 can be enhanced. When the region in which the curved surface 53r of the key member 53 is in line contact with the support surface 54f of the bearing housing 51 becomes narrower, the pressure generated between the curved surface 53r of the key member 53 and the support surface 54f of the bearing housing 51 increases. However, since the curved surface 53r of the key member 53 is formed of a material having high hardness, the wear of the curved surface 53r can be minimized even in such a case.

Furthermore, the present disclosure is not limited to the centrifugal compressor and can also be applied to other rotary machines such as engines as long as the rotating shaft is supported by the journal bearing.

EXPLANATION OF REFERENCES

1 Rotating shaft
1f Outer circumferential surface
2 Flow path
3 Casing
4 Impeller
5 Journal bearing
6 Thrust bearing
7 Suction port
8 Discharge port
10 Centrifugal compressor (rotary machine)
51 Bearing housing (housing)
51a Inner circumferential surface
51h Bolt insertion hole
51j Wiring hole
52 Bearing pad
52f Pad surface
52g Pad rear surface
52h Sensor insertion hole
52t Convex portion
53 Key member
53r Curved surface
53s Fixed surface
54 Pad receiving groove
54f Support surface
54k Protrusion
54w Wall portion
55 Receiving concave portion
55h Key member mounting surface
56 Metal portion
57 Support portion
58 Concave portion
59 Positioning member
59a Bolt main body
59b Spherical portion
60 Temperature sensor
61 Sensor wiring
70 Lubricating oil supply nozzle
90 Key insertion concave portion
91 Bottom surface
G Process gas
O Central axis
P Portion
R0 Curvature radius
R1 Curvature radius
R2 Curvature radius
R3 Curvature radius

What is claimed is:

1. A journal bearing comprising:
a plurality of bearing pads having pad surfaces configured to slidably come into contact with an outer circumferential surface of a rotating shaft and disposed at intervals in a circumferential direction around a central axis;
a key member provided at a part of a pad rear surface which faces radially outward of the bearing pad, the key member having a curved surface which is curved around an axis parallel to the central axis, the key member being formed of a material having a hardness higher than that of a material forming the pad rear surface of the bearing pad; and
a housing having a support surface, which is curved around the central axis, in line contact with a part of the curved surface of the key member in the circumferential direction in a direction of the central axis in which the central axis extends, the housing being configured to support the key member and the bearing pad to be swingable from an outer side in a radial direction of the key member and the bearing pad,
wherein the key member has a rectangular shape extending in the direction of the central axis when viewed in the radial direction,
the key member is fixed to the pad rear surface by performing punching at a plurality of portions of the key member on a boundary with the pad rear surface,
a length of the key member in the direction of the central axis is shorter than a length of the bearing pad in the direction of the central axis,
a curvature radius of the curved surface is less than a curvature radius of the support surface,
the curved surface is formed continuously in the direction of the central axis with a same shape and the same curvature radius, and
the curved surface is continuously formed with the same width between one portion and another portion, which is adjacent to the one portion in the direction of the central axis, of the plurality of portions.

2. The journal bearing according to claim 1,
wherein the bearing pad has a key member mounting surface orthogonal to the radial direction, and
the key member has a fixed surface which faces the key member mounting surface and is orthogonal to the radial direction.

3. The journal bearing according to claim 2,
wherein only the curved surface configures to be in contact with the support surface of the housing when the key member and the bearing pad swing.

4. The journal bearing according to claim 3, further comprising a concave portion formed in the curved surface of the key member and recessed radially inward at an intermediate position of the curved surface in the circumferential direction, and a positioning member configured to protrude radially inward from the support surface and fixed to the key member in a state in which it is inserted into the concave portion.

5. The journal bearing according to claim 2, further comprising a concave portion formed in the curved surface of the key member and recessed radially inward at an intermediate position of the curved surface in the circumferential direction, and a positioning member configured to protrude radially inward from the support surface and fixed to the key member in a state in which it is inserted into the concave portion.

6. The journal bearing according to claim 1, wherein only the curved surface configures to be in contact with the support surface of the housing when the key member and the bearing pad swing.

7. The journal bearing according to claim 6, further comprising a concave portion formed in the curved surface of the key member and recessed radially inward at an intermediate position of the curved surface in the circumferential direction, and a positioning member configured to protrude radially inward from the support surface and fixed to the key member in a state in which it is inserted into the concave portion.

8. The journal bearing according to claim 1, further comprising a concave portion formed in the curved surface of the key member and recessed radially inward at an intermediate position of the curved surface in the circumferential direction, and a positioning member configured to protrude radially inward from the support surface and fixed to the key member in a state in which it is inserted into the concave portion.

9. The journal bearing according to claim 1, wherein the curved surface of the key member and the pad rear surface of the bearing pad have the same curvature radius in the circumferential direction.

10. The journal bearing according to claim 1, wherein the curved surface of the key member has a smaller curvature radius in the circumferential direction than the pad rear surface of the bearing pad.

11. A rotary machine comprising:
a rotating shaft; and
a journal bearing according to claim 1 which supports the rotating shaft.

* * * * *